United States Patent
Robbins et al.

(10) Patent No.: US 8,839,315 B2
(45) Date of Patent: *Sep. 16, 2014

(54) APPARATUS AND METHOD FOR MANAGING A PRESENTATION OF MEDIA CONTENT

(71) Applicant: AT&T Intellectual Property I, LP, Atlanta, GA (US)

(72) Inventors: William Stanley Robbins, Sun Prairie, WI (US); R. Tyler Wallis, Dallas, TX (US); Anup D. Karnalkar, Allen, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/677,438

(22) Filed: Nov. 15, 2012

(65) Prior Publication Data

US 2013/0074130 A1 Mar. 21, 2013

Related U.S. Application Data

(63) Continuation of application No. 12/339,373, filed on Dec. 19, 2008, now Pat. No. 8,369,249.

(51) Int. Cl.
*H04N 7/10* (2006.01)
*G06F 3/00* (2006.01)
*H04N 7/18* (2006.01)
*H04L 12/16* (2006.01)
*H04N 21/442* (2011.01)
*H04L 29/06* (2006.01)
*H04N 21/436* (2011.01)
*H04N 21/41* (2011.01)
*H04N 21/4788* (2011.01)
*H04N 21/45* (2011.01)
*H04N 21/482* (2011.01)
*H04N 21/488* (2011.01)
*H04M 1/725* (2006.01)

(52) U.S. Cl.
CPC ......... *H04N 21/45* (2013.01); *H04N 21/44209* (2013.01); *H04L 65/80* (2013.01); *H04L 65/1059* (2013.01); *H04N 21/43615* (2013.01); *H04M 1/7253* (2013.01); *H04N 21/4126* (2013.01); *H04N 21/44231* (2013.01); *H04N 21/4788* (2013.01); *H04L 65/1069* (2013.01); *H04N 21/482* (2013.01); *H04N 21/4882* (2013.01); *H04M 1/72597* (2013.01)
USPC .................. 725/81; 725/33; 725/58; 725/80; 370/270

(58) Field of Classification Search
USPC ........................... 725/33, 58, 80–81; 375/270
See application file for complete search history.

(56) References Cited

U.S. PATENT DOCUMENTS

| | | |
|---|---|---|
| 5,623,537 A | 4/1997 | Ensor |
| 6,292,210 B1 | 9/2001 | Gerszberg |

(Continued)

*Primary Examiner* — Gigi L Dubasky
(74) *Attorney, Agent, or Firm* — Guntin & Gust, PLC; Andrew Gust

(57) ABSTRACT

A system that incorporates teachings of the present disclosure may include, for example, a communication device having a controller to detect a media device operating externally to the communication device actively engaged in presenting media content, detect an incoming communication session initiated by another communication device, present a notice identifying the media device and the media content being presented by the media device, detect a directive to modify an operation of the media device to mitigate interrupting a communication session with the other communication device, and instruct the media device to modify its operation according to the directive. Other embodiments are disclosed.

20 Claims, 7 Drawing Sheets

(56) References Cited

U.S. PATENT DOCUMENTS

| | | |
|---|---|---|
| 6,741,684 B2 | 5/2004 | Kaars |
| 6,842,622 B2 | 1/2005 | Peters et al. |
| 7,515,698 B2 | 4/2009 | Wyk |
| 2002/0061095 A1* | 5/2002 | Beecroft .................. 379/110.01 |
| 2004/0177378 A1 | 9/2004 | Cool |
| 2004/0254995 A1* | 12/2004 | Oka et al. ...................... 709/206 |
| 2005/0277406 A1* | 12/2005 | Diroo et al. ................. 455/412.2 |
| 2006/0210050 A1 | 9/2006 | Bartfeld |
| 2006/0291471 A1* | 12/2006 | Heuer et al. ................ 370/395.5 |
| 2007/0274486 A1 | 11/2007 | Kister |
| 2010/0031288 A1 | 2/2010 | Scott |
| 2010/0115567 A1* | 5/2010 | Gupta et al. ................... 725/106 |

* cited by examiner

500

700

APPARATUS AND METHOD FOR MANAGING A PRESENTATION OF MEDIA CONTENT

CROSS-REFERENCE TO RELATED APPLICATIONS

This application is a continuation of and claims priority to U.S. patent application Ser. No. 12/339,373, filed Dec. 19, 2012, all of which is incorporated herein by reference in their entirety.

FIELD OF THE DISCLOSURE

The present disclosure relates generally to presentation techniques and more specifically to an apparatus and method for managing a presentation of media content.

BACKGROUND

There are many types of media devices today such as for example MP3 players, set-top boxes, DVD players, DVR recorders, CD players, and so on. It is not uncommon for an individual to engage in communication activities such as a phone conversation while media devices are in the midst of presenting media content.

DETAILED DESCRIPTION

One embodiment of the present disclosure can entail a communication device having a controller to detect a media device operating externally to the communication device actively engaged in presenting media content, detect an incoming communication session initiated by another communication device, present a notice identifying the media device and the media content being presented by the media device, detect a directive to modify an operation of the media device to mitigate interrupting a communication session with the other communication device, and instruct the media device to modify its operation according to the directive.

Another embodiment of the present disclosure can entail a computer-readable storage medium operating in a communication device having computer instructions to detect a media device actively engaged in presenting media content, detect an incoming communication session initiated by another communication device, and instruct the media device to modify its operation to mitigate interrupting a communication session with the other communication device.

Yet another embodiment of the present disclosure can entail a media device having a controller to present media content supplied by a media communication system, notify a communication device in a vicinity of the media device of the presentation, and receive a request from the communication device to modify the presentation of the media content to mitigate an interruption of a communication session between the communication device and another communication device.

Another embodiment of the present disclosure can entail signaling a media device to modify a presentation of media content to mitigate an interruption of a communication session between communication devices.

Figure 1:
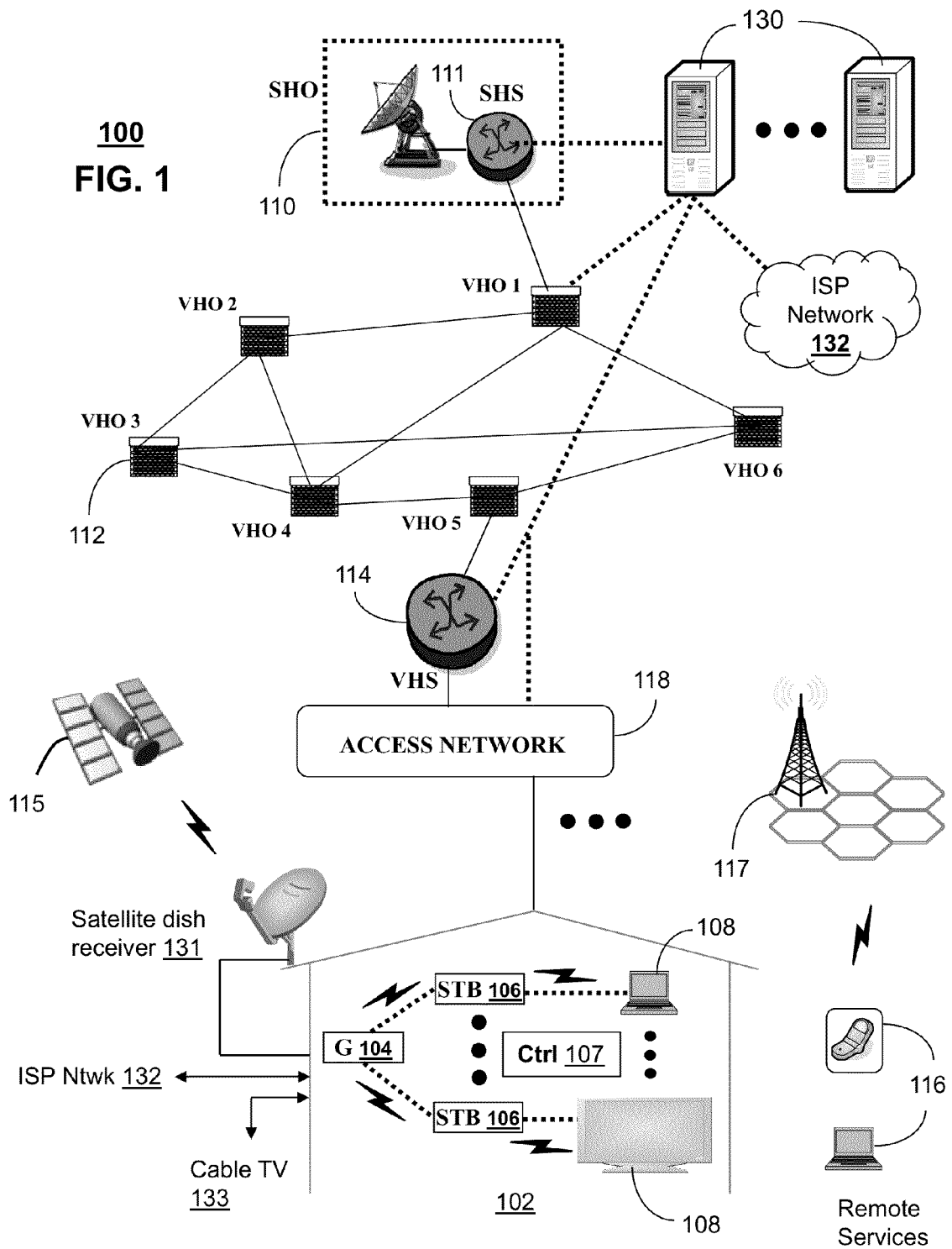
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
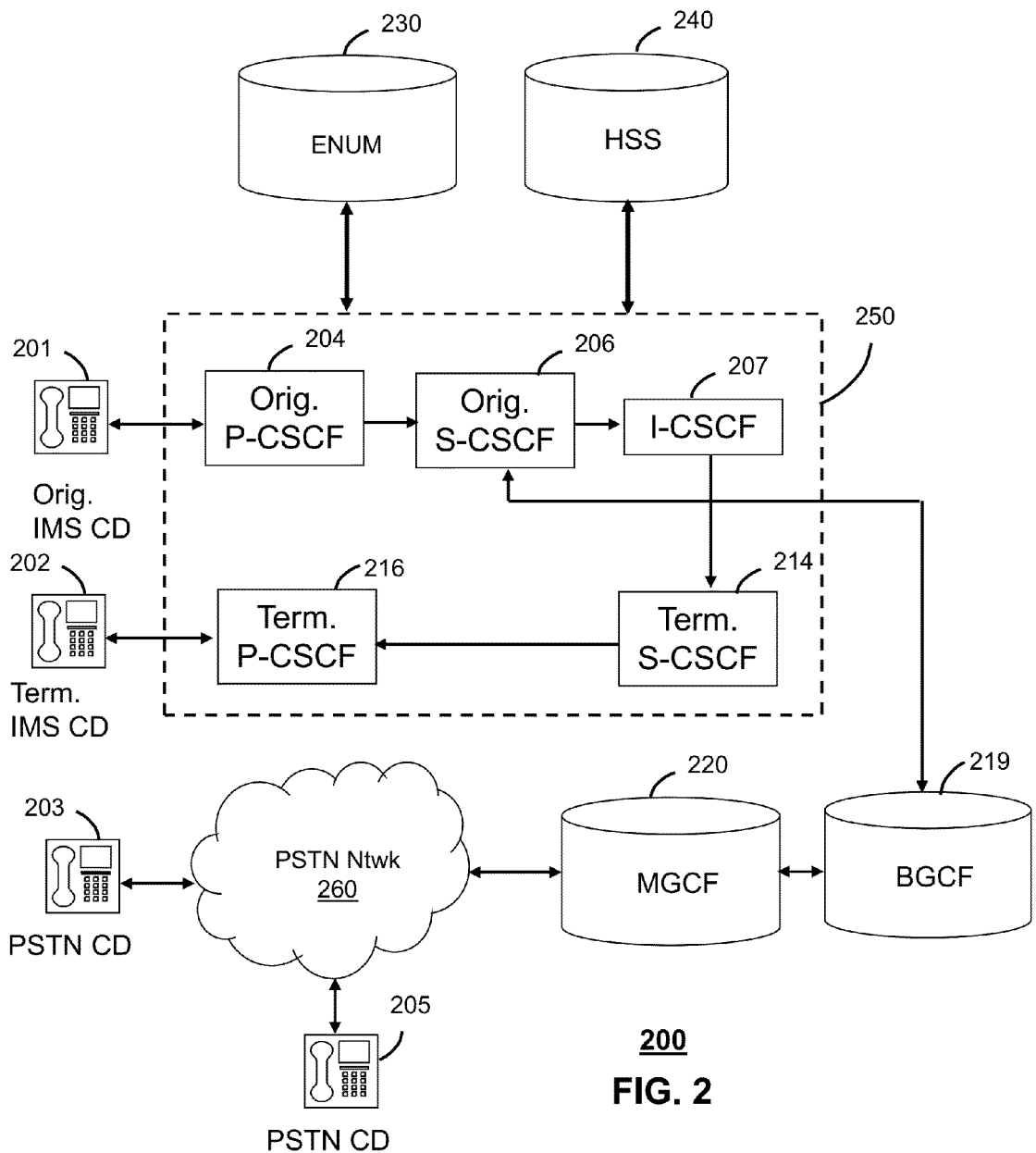

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
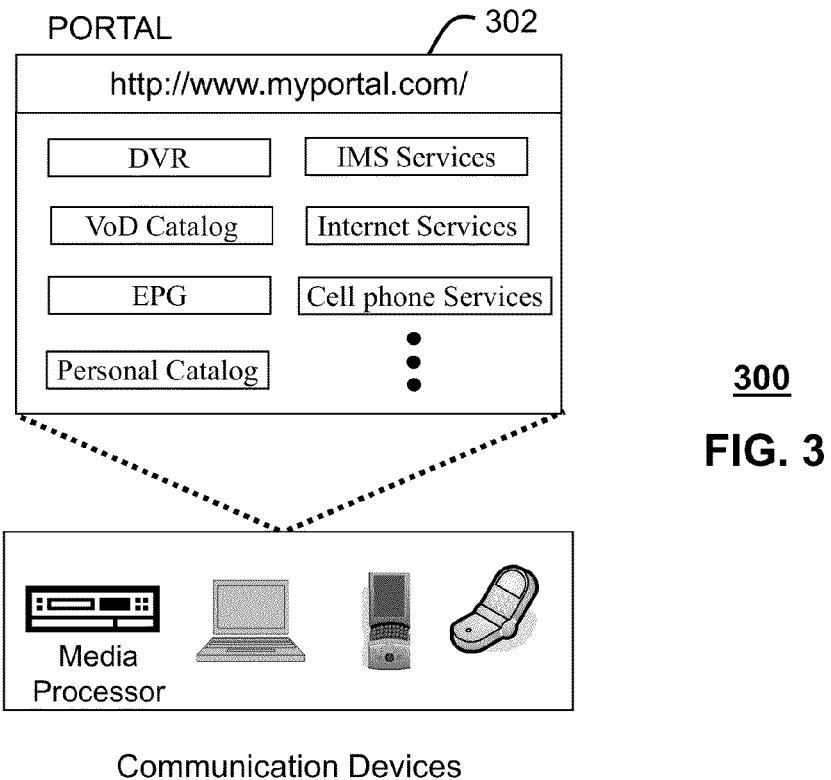
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
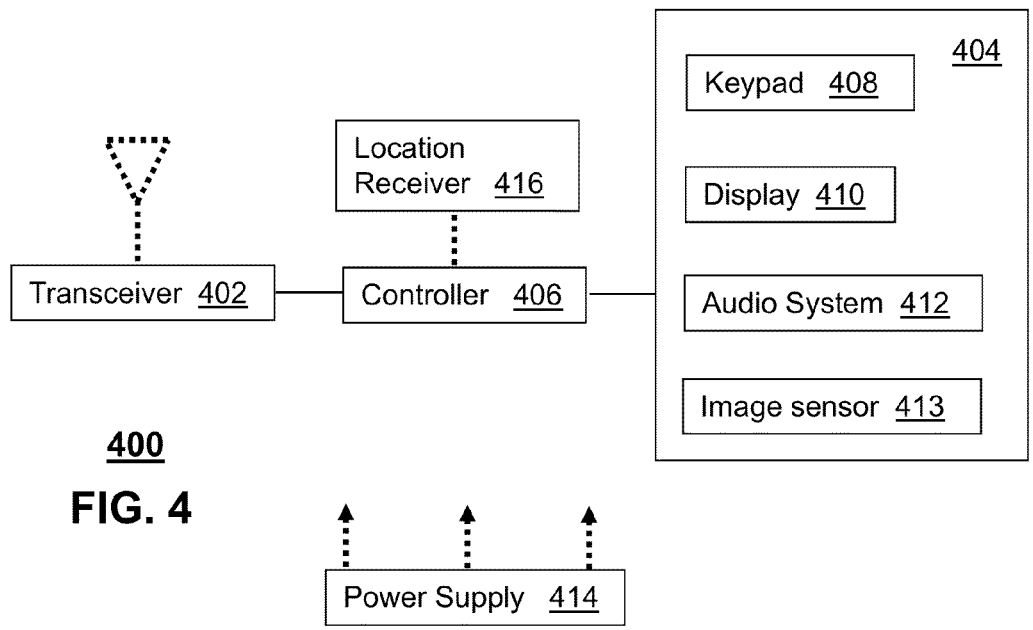
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
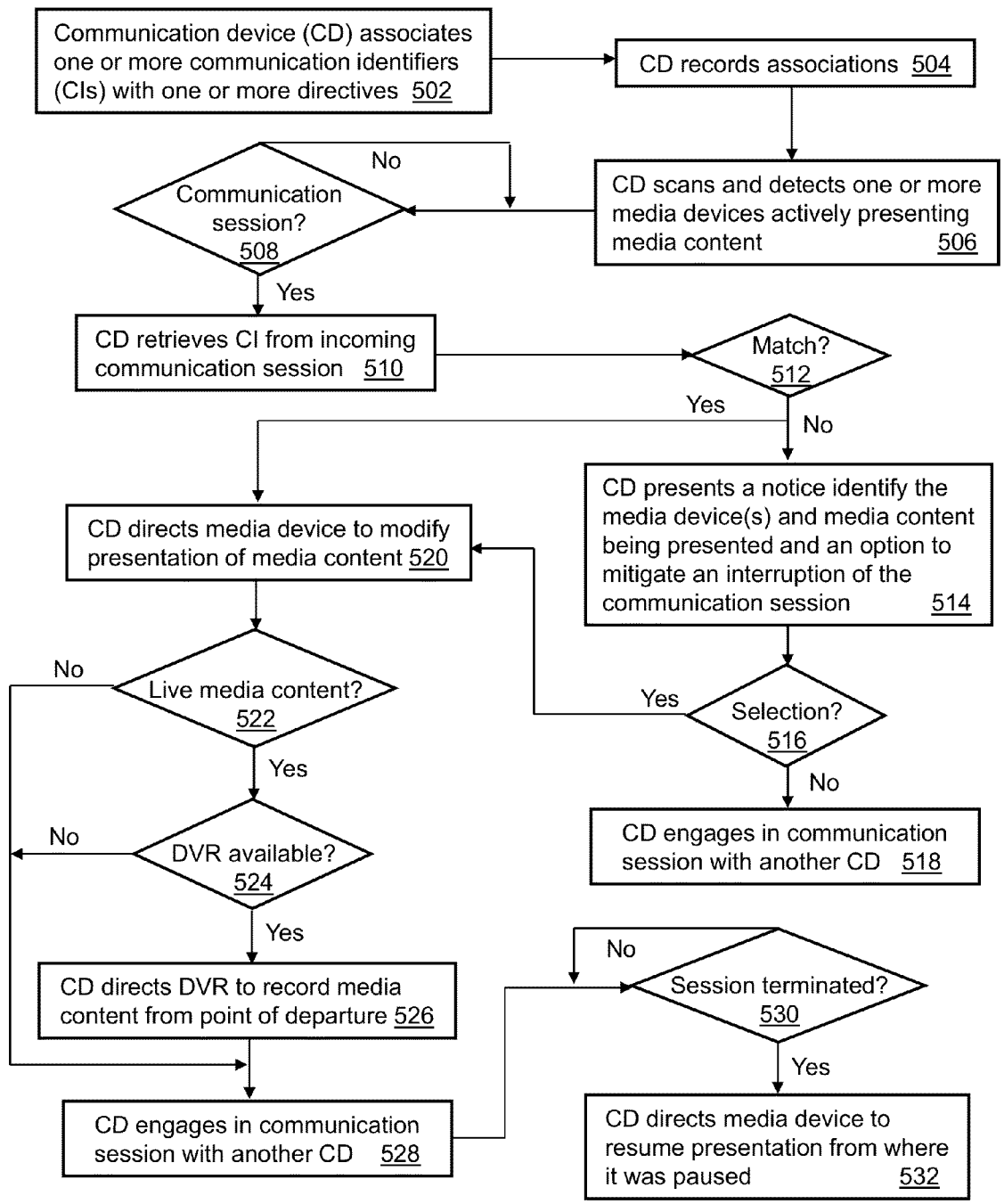
FIG. 5 depicts an illustrative embodiment of a method according to the present disclosure.
Figure 6:
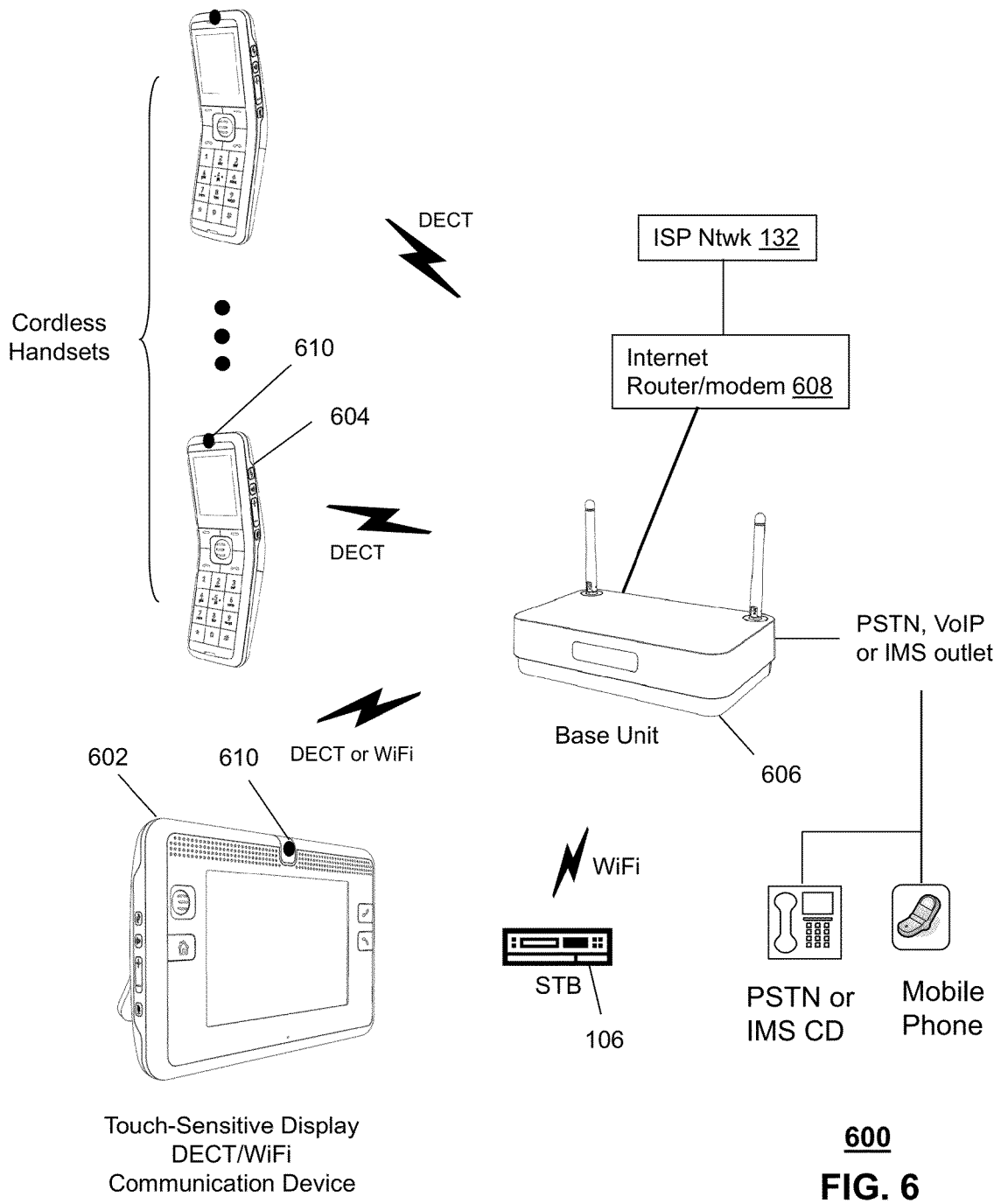
FIGS. 6-7 depict illustrative embodiments of the method of FIG. 5.

FIG. 5 depicts an illustrative a method 500 operating in portions of the aforementioned communication systems. FIG. 6 shows an illustrative embodiment of communication devices operating according to method 500. Block diagram 600 comprises a landline communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the ISP network 132. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures. The tablet 602 can also monitor the activities of media devices such as the STB 106 by way of the base unit 606 using a WiFi air interface.

With the configuration of FIG. 6 in mind, method 500 can begin with step 502 in which a communication device such as the tablet 602 associates one or more communication identifiers with one or more directives. A communication identifier in the present context can represent an E.614 number, a SIP URI, an email address, and instant messaging address, an SMS address, and MMS address, just to mention a few. A directive can represent one or more instructions submitted to a media device to control its operations. For example, a directive can represent an instruction to be executed by the media device for pausing a presentation of media content. Another directive can represent an instruction to lower speaker volume or mute an audible portion of the presentation of media content. Other instructions are possible such as a directive to the media device or a DVR device coupled thereto to initiate a DVR recording while the presentation of the media content is paused.

Step 502 can be implemented by way of a graphical user interface (GUI) presented by the tablet 602. The associations can be performed by way of entries in an address book, or independently by way of a specialized GUI. The associations can be recorded in step 504 and can be periodically updated by reinitiating steps 502 and 504. In step 506, the tablet 602 can scan and detect one or more media devices actively presenting media content. The tablet 602 can scan for media devices by way of the base unit 606 being communicatively coupled to other WiFi-capable devices such as the STB 106 shown in FIG. 6.

Once a media device such as the STB 106 is detected, the tablet 602 can direct the STB 106 to provide information that describes itself (e.g., STB family room) and information associated with the media content being presented. Media content in the present context can represent audio content, still or moving image content, or both. The STB 106 can provide metadata to the tablet 602 describing what is being presented (e.g., Mission Impossible III), a speaker volume level of the media content is being presented, and the resource available to the STB to record the media content (e.g., DVR). With this information in hand, the tablet 602 can begin to monitor incoming communication sessions in step 508.

If an incoming communication session such as a voice or video call is detected in step 508, the tablet 602 can proceed to step 510 where it retrieves a communication identifier (e.g., caller ID) from the call. If the communication identifier matches an associated directive recorded in step 504, the tablet proceeds to step 520. In this step, the tablet 602 transmits by way of the base unit 606 over the WiFi air interface the identified directive to media device to modify the presentation of the media content. The directive can represent for example muting the presentation, pausing the presentation, lowering the volume of presentation, or some other mitigating factor defined by the directive. Other directives for modifying the presentation of the media content are possible and therefore contemplated by the present disclosure.

Once the media device has modified the presentation of the media content, the tablet 602 can proceed to steps 522-524 where it can take steps to prevent loss of content. In these steps the tablet 602 can determine whether the media content is a live broadcast and whether a DVR is available in step 524. If the media content is a live broadcast, and a DVR is available, the tablet 602 can direct the DVR in step 526 to record the media content from the point at which it was paused. Steps 520-526 can operate together in rapid succession (or contemporaneously) to prevent loss of content.

Once the presentation has been paused (and possibly being recorded by a DVR), the tablet 602 can accept in step 528 the communication request from the other communication device (e.g., caller's mobile phone). The modified presentation of the media content can reduce if not eliminate an interruption between the user of the tablet 602 and someone else communicating with the user by way of the communication device that initiated the call. Once the communication session is terminated in step 530, the tablet 602 can direct the media device to resume presentation from where it was paused. This step can represent a number of instructions directed to the STB and the DVR.

Figure 7:
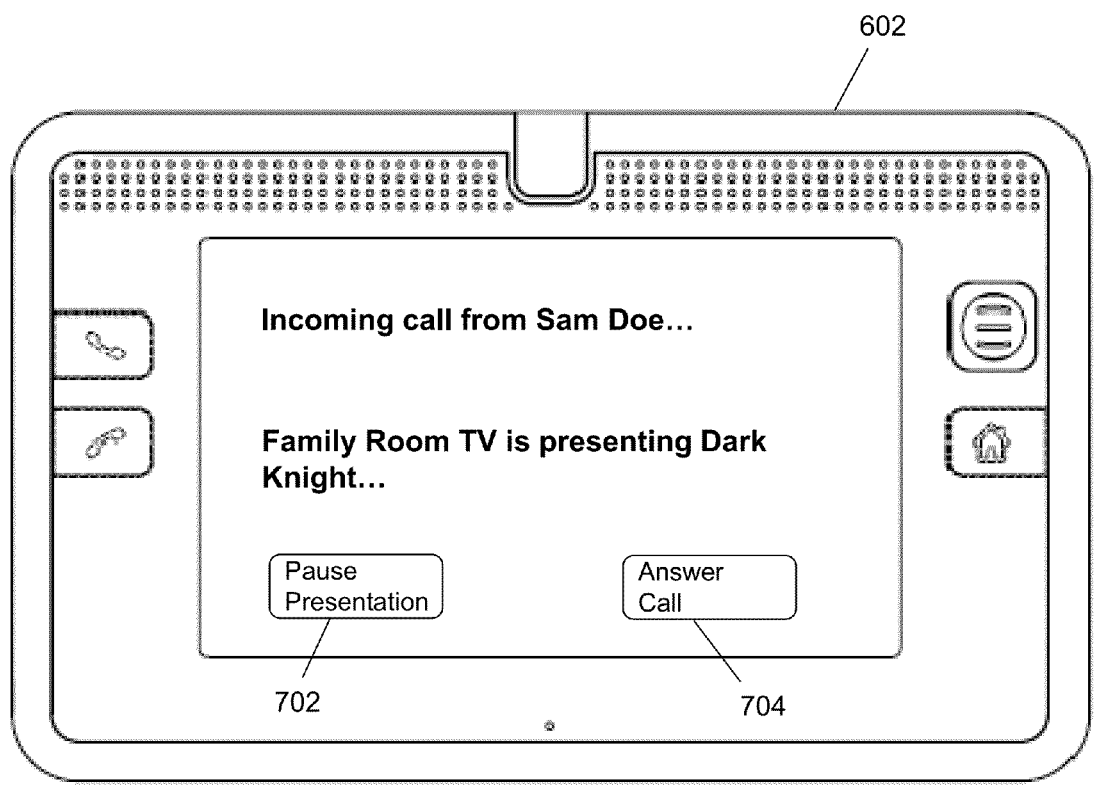

Referring back to step 512, when the communication identifier retrieved in step 510 matches an associated directive recorded in step 504, the tablet 602 can follow an automated path for mitigating an interruption by media devices in a vicinity of the tablet. When a match, however, is not detected, the tablet 602 can present its user in step 514 a notice that identifies the media devices and media content being presented and an option to mitigate an interruption to the communication session if it is accepted. FIG. 7 shows an illustrative embodiment of step 514.

In this illustration, the tablet 602 presents a GUI with a message indicating Sam Doe is calling. The notice also shows that the Family Room TV is presenting the movie the Dark Knight. To mitigate an interruption to the voice call with Sam Doe, the tablet 602 can offer the user an option to pause the presentation of the movie by pressing button 702. If the selection of button 702 is detected in step 516, the tablet 602 proceeds to step 520 where it directs the STB 106 to pause the movie. Steps 522-526 can be used to record the presentation if it is a live broadcast. If the movie is derived from a DVD player, the pause request can occur with no loss of content and steps 522-526 would be skipped.

If the user does not care to pause the presentation in step 516, the user can select button 704 to answer the call, which directs the tablet 602 to accept the communication request in step 518 without mitigation. In this instance, the user of the tablet 602 may have decided that the presentation of the movie was acceptable while engaging in a voice communication with Sam Doe.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that it applies to any form of communication: email, video call, instant messaging, SMS, and MMS. Method 500 can also be adapted so that it applies to all types of media devices including media players, gaming consoles, and other devices which can potentially interrupt a user during a communication session. Method 500 can also be adapted so that the communication device can also be communicatively coupled to media devices by a wireline interface such as wireline Ethernet. In yet another embodiment, the communication device can represent a mobile phone, PDA, or computer.

Other suitable modifications can be applied to the present disclosure without departing from the scope of the claims below. Accordingly, the reader is directed to the claims section for a fuller understanding of the breadth and scope of the present disclosure.

Figure 8:
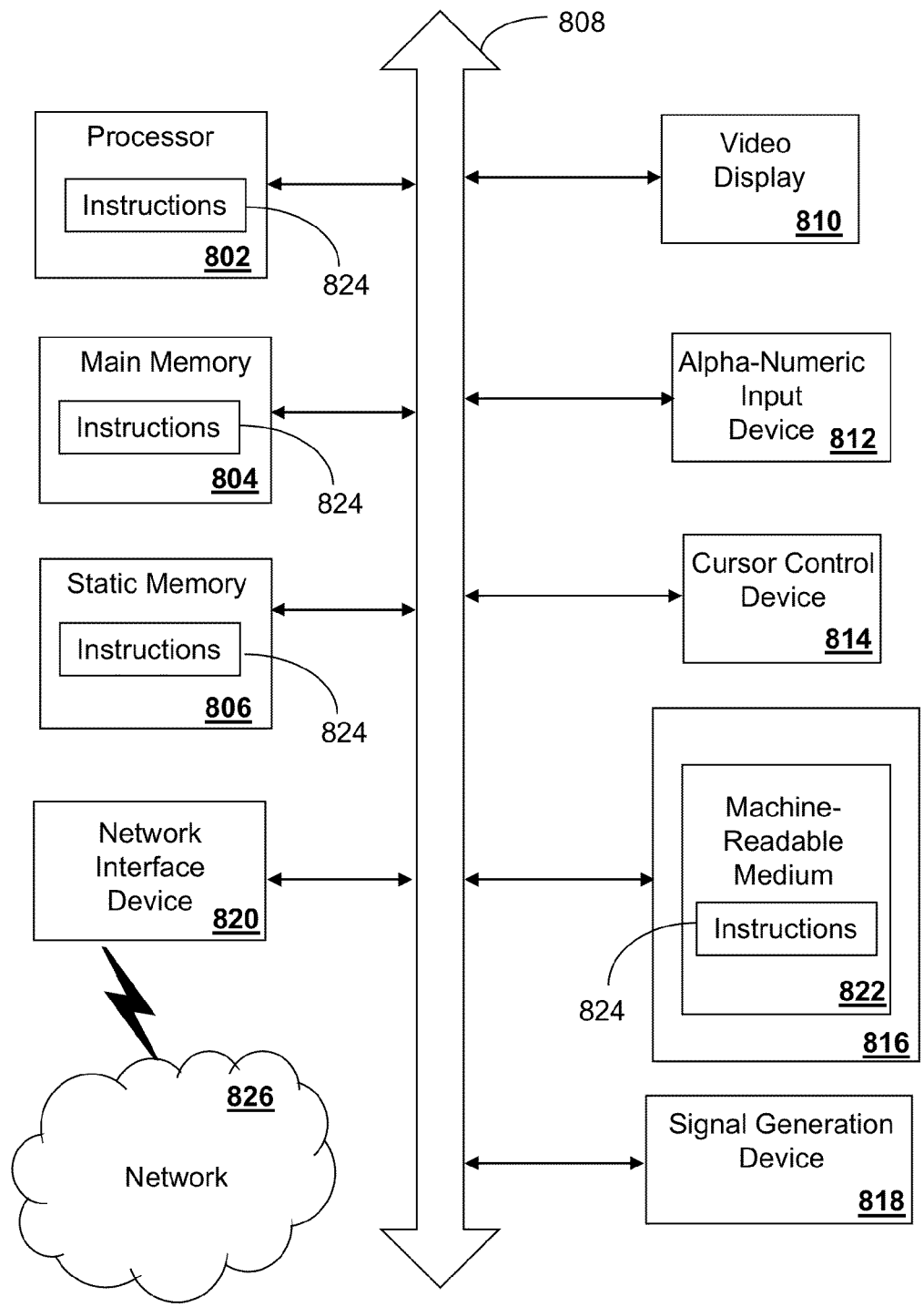
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first communication device, comprising:
a display;
a memory to store computer instructions;
a wireless transmitter; and
a controller coupled to the display, the memory and the wireless transmitter, wherein the controller, responsive to executing the computer instructions, performs operations comprising:
generating an association of a communication identifier with a directive to mitigate interrupting a presentation of media content caused by a communication session between the first communication device and a second communication device;
recording the association in an address book;
detecting a set top box external to the first communication device actively engaged in a presentation of the media content;
receiving from the set top box metadata descriptive of the presentation of the media content;
detecting an incoming communication session initiated by the second communication device;
detecting the communication identifier associated with the incoming communication session;
detecting the directive from the association of the communication identifier and the directive;
wirelessly transmitting from the first communication device to the set top box an instruction to modify the presentation of the media content as described by the metadata according to the directive responsive to detecting establishment of the communication session between the first and second communication devices; and
presenting a notice including an option which when selected directs the set top box to pause the presentation of the media content.

2. The first communication device of claim 1, wherein the first communication device corresponds to a mobile phone, and wherein the communication session corresponds to a video communication session.

3. The first communication device of claim 1, wherein the first communication device corresponds to a computer, and wherein the communication session corresponds to a voice communication session.

4. The first communication device of claim 1, wherein the first communication device corresponds to a mobile phone, and wherein the communication session corresponds to an instant messaging session.

5. The first communication device of claim 4, wherein the operations further comprise:
detecting the selection of the option; and
directing the set top box to pause the presentation of the media content.

6. The first communication device of claim 5, wherein the operations further comprise directing a media recorder communicatively coupled to the set top box to record the media content while the media presentation has been paused.

7. The first communication device of claim 5, wherein the operations further comprise directing the set top box to resume the presentation of the media content.

8. The first communication device of claim 7, wherein the set top box resumes the presentation of the media content from a demarcation point established at a time the presentation of the media content was paused.

9. The first communication device of claim 1, wherein the media content corresponds to audio content and image content.

10. The first communication device of claim 1, wherein the first communication device communicates over an internet protocol multimedia subsystem communication system.

11. The first communication device of claim 1, wherein the first communication device communicates over a cellular communication system.

12. The first communication device of claim 1, wherein the operations further comprise:
generating associations of communication identifiers with corresponding directives;
recording the associations; and
identifying the association between the communication identifier and the directive from the associations.

13. The first communication device of claim 1, wherein the notice identifies the set top box by name and describes the media content being presented.

14. A non-transitory computer-readable storage medium, comprising computer instructions, which when executed by a processor of a first communication device, causes the processor to perform operations comprising:
associating a communication identifier with a directive to mitigate interrupting a presentation of media content caused by a communication session between the first communication device and a second communication device;
recording the association;
detecting a media device actively engaged in presenting the media content;
receiving from the media device information characterizing the presentation of the media content;
detecting an incoming communication session initiated by the second communication device;
identifying the communication identifier from the incoming communication session;
identifying from the recorded association the directive associated with the communication identifier;
wirelessly transmitting an instruction from the first communication device to the media device to modify the presentation of the media content as characterized by the information according to the directive to mitigate interrupting the presentation of the media content responsive to detecting that communications have been established between the first and second communication devices; and
directing a media recorder communicatively coupled to the media device to record the media content while the media presentation has been paused, wherein the media device is operable to resume the presentation of the media content from a demarcation point established at a time the presentation of the media content was paused.

15. The non-transitory storage medium of claim 14, wherein the media device comprises a set-top box, wherein the first communication device comprises a mobile phone, and wherein the media content comprises audio content and image content.

16. The non-transitory storage medium of claim 14, wherein the operations further comprise presenting a notice with an option which when selected directs the media device to pause the presentation of the media content.

17. The non-transitory storage medium of claim 16, wherein the operations further comprise:
detecting the selection of the option; and
directing the media device to pause the presentation of the media content.

18. The non-transitory storage medium of claim 14, wherein the media device comprises a set-top box, wherein the first communication device comprises a land-line phone, and wherein the media content comprises audio content and image content.

19. The non-transitory storage medium of claim 14, wherein the media device comprises a gaming console, wherein the first communication device comprises a computer, and wherein the media content comprises audio content and image content.

20. A non-transitory computer-readable storage medium, comprising computer instructions, which when executed by a processor of a mobile communication device, causes the processor to perform operations comprising:
associating a communication identifier with a directive to mitigate interrupting a presentation of media content caused by a communication session between the mobile communication device and a second communication device;
recording the association;
detecting a media device actively engaged in presenting the media content;
receiving from the media device information characterizing the presentation of the media content;
detecting an incoming communication session initiated by the second communication device;
identifying the communication identifier from the incoming communication session;
identifying from the recorded association the directive associated with the communication identifier;
wirelessly transmitting an instruction from the mobile communication device to the media device to modify the presentation of the media content as characterized by the information according to the directive to mitigate interrupting the presentation of the media content responsive to detecting that communications have been established between the mobile and second communication devices; and
directing a media recorder communicatively coupled to the media device to record the media content while the media presentation has been paused, wherein the media device is operable to resume the presentation of the media content from a demarcation point established at a time the presentation of the media content was paused, wherein the mobile communication device communicates over an internet protocol multimedia subsystem communication system.

* * * * *